United States Patent
Ko et al.

(10) Patent No.: US 12,062,773 B2
(45) Date of Patent: Aug. 13, 2024

(54) METHOD FOR DETERMINING DEGREE OF WETTING BY USING LOW CURRENT TEST

(71) Applicant: LG ENERGY SOLUTION, LTD., Seoul (KR)

(72) Inventors: Myung-Hoon Ko, Daejeon (KR); Jee-Ho Kim, Daejeon (KR); Yong-Tae Lee, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 283 days.

(21) Appl. No.: 17/623,510

(22) PCT Filed: Jul. 2, 2020

(86) PCT No.: PCT/KR2020/008661
§ 371 (c)(1),
(2) Date: Dec. 28, 2021

(87) PCT Pub. No.: WO2021/002701
PCT Pub. Date: Jan. 7, 2021

(65) Prior Publication Data
US 2022/0359856 A1    Nov. 10, 2022

(30) Foreign Application Priority Data

Jul. 2, 2019    (KR) .................. 10-2019-0079604

(51) Int. Cl.
*H01M 4/04*        (2006.01)
*H01M 10/0525*    (2010.01)
*H01M 10/44*      (2006.01)

(52) U.S. Cl.
CPC ..... *H01M 4/0447* (2013.01); *H01M 10/0525* (2013.01); *H01M 10/446* (2013.01)

(58) Field of Classification Search
None
See application file for complete search history.

(56) References Cited

U.S. PATENT DOCUMENTS

2003/0009985 A1    5/2003    Kim et al.
2013/0162258 A1    6/2013    Patin et al.
(Continued)

FOREIGN PATENT DOCUMENTS

CN        1457520 A      11/2003
CN      103424710 A      12/2013
(Continued)

OTHER PUBLICATIONS

Extended European Search Report dated Apr. 20, 2023 for Application No. 20835187.4.
(Continued)

*Primary Examiner* — Maria Laios
(74) *Attorney, Agent, or Firm* — Birch, Stewart, Kolasch & Birch, LLP

(57) ABSTRACT

Provided is a method for determining the wetting degree of a lithium ion battery cell using a low current test. The wetting degree determination method according to the present disclosure includes a) obtaining, as a reference charge profile, a charge profile recorded while charging a reference battery cell having undergone receiving an electrode assembly and an electrolyte solution in a case, assembling and pre-aging with a low current of 0.01 C-rate or less, b) measuring and recording a charge profile while charging another battery cell having undergone receiving an electrode assembly and an electrolyte solution in a case, assembling and pre-aging with a low current of 0.01 C-rate or less in the same way as the reference battery cell, and c) determining the wetting degree of another battery cell relative to the
(Continued)

reference battery cell by comparative analysis of the reference charge profile and the measured charge profile.

20 Claims, 5 Drawing Sheets

(56) References Cited

U.S. PATENT DOCUMENTS

| | | | |
|---|---|---|---|
| 2013/0317771 A1 | 11/2013 | Laskowsky et al. | |
| 2015/0079463 A1* | 3/2015 | Yamamoto | H01M 4/131 |
| | | | 429/188 |
| 2015/0255833 A1 | 9/2015 | Fujimaki et al. | |
| 2016/0172718 A1 | 6/2016 | Kawashima et al. | |
| 2018/0164384 A1 | 6/2018 | Kwon et al. | |
| 2019/0033380 A1 | 1/2019 | Kim et al. | |
| 2019/0131638 A1 | 5/2019 | Won et al. | |
| 2020/0358147 A1* | 11/2020 | Dou | G01N 29/262 |
| 2021/0167432 A1* | 6/2021 | Han | G01R 31/3648 |
| 2022/0263086 A1* | 8/2022 | Lin | H01M 4/0404 |

FOREIGN PATENT DOCUMENTS

| | | |
|---|---|---|
| CN | 107959071 A | 4/2018 |
| CN | 109142451 A | 1/2019 |
| EP | 2 607 911 A1 | 6/2013 |
| JP | 2004-361253 A | 12/2004 |
| JP | 2010-102928 A | 5/2010 |
| JP | 2014-99275 A | 5/2014 |
| JP | 2015-22861 A | 2/2015 |
| JP | 2010-135186 A | 6/2024 |
| KR | 10-0865401 B1 | 10/2008 |
| KR | 10-1096940 B1 | 12/2011 |
| KR | 10-2014-0032711 A | 3/2014 |
| KR | 10-2015-0089209 A | 3/2015 |
| KR | 10-2016-0000141 A | 1/2016 |
| KR | 10-2017-0067042 A | 6/2017 |
| KR | 10-2017-0105320 A | 9/2017 |
| KR | 10-2017-0111772 A | 10/2017 |
| KR | 10-2018-0068708 A | 6/2018 |
| KR | 10-2018-0080914 A | 7/2018 |
| KR | 10-2019-0046548 A | 5/2019 |
| KR | 10-2019-0048849 A | 5/2019 |

OTHER PUBLICATIONS

International Search Report for PCT/KR2020/008661 mailed on Oct. 28, 2020.

* cited by examiner

METHOD FOR DETERMINING DEGREE OF WETTING BY USING LOW CURRENT TEST

TECHNICAL FIELD

The present disclosure relates to a method for determining the wetting degree of a lithium ion battery cell, and more particularly, to a determination method for evaluating the wetting degree without disassembling an assembled battery cell. The present application claims the benefit of Korean Patent Application No. 10-2019-0079604 filed on Jul. 2, 2019 with the Korean Intellectual Property Office, the disclosure of which is incorporated herein by reference in its entirety.

BACKGROUND ART

Lithium ion batteries that can be recharged repeatedly are gaining attention as an alternative to fossil energy. They have been primarily used in traditional handheld devices such as mobile phones, video cameras and electric power tools. Recently, the range of applications tends to gradually extend to electric vehicles (EVs, HEVs, PHEVs), large-capacity energy storage systems (ESSs) and uninterruptible power systems (UPSs) that work on electricity.

A lithium ion battery includes at least one battery cell including a positive electrode, a negative electrode, a separator and an electrolyte solution as the basic components. The battery cell is charged/discharged by the repeated process of intercalation and deintercalation of lithium ions between lithium metal oxide of the positive electrode and graphite of the negative electrode. The assembling of the battery cell is performed by stacking the porous positive and negative electrodes and the separator in an alternating manner, putting it in a case, and injecting the electrolyte solution. In this instance, when the electrolyte solution permeates the positive electrode, the negative electrode and the separator by the capillary force, the inside and interface of each component get wet. This is referred to as wetting or impregnation.

When the thickness of an active material layer coated on the current collector of the electrode increases to increase the energy density of the battery cell, wetting of an electrode active material by the electrolyte solution is not enough. Generally, since the electrolyte solution is hydrophilic, the electrolyte solution has low affinity for hydrophobic electrode active material components, and when the volume of the electrode active material layer increases, the movement pathway of the electrolyte solution increases, resulting in poor permeation of the electrolyte solution, which makes it difficult to achieve a sufficient wetting degree. When the electrolyte solution is not sufficiently infiltrated into the electrode, for example, ion movement is slowed down, and electrode reactions are also slow, resulting in low efficiency of the battery cell.

Since assembling is performed on the battery cell in discharged state, after the assembled battery cell is activated by primary charging, the battery cell can perform its function. The primary charging is referred to as a formation process or an activation process. To evaluate the wetting degree after the electrolyte solution injection, testing is performed on the disassembled battery cell before the formation process. Alternatively, testing is performed after the formation process. The typical conventional test method includes a PC solvent impregnation method, an impregnated area observation method, a negative electrode state of charge (SOC) analysis method, an air scanner analysis method and an electrochemical impedance spectroscopy (EIS) analysis method.

Among them, the propylene carbonate (PC) solvent impregnation method observes the degree of absorption using linear carbonate as the electrolyte solution solvent, the impregnated area observation method immerses a bi-cell or mono-cell unit in the electrolyte solution and observes or measures an impregnated area, and the negative electrode SOC analysis method peels the active material layer from the current collector and observes it after charging to 100% SOC or a predetermined SOC or more. However, they are all destructive tests, and cannot be used in mass production applications.

Among these conventional test methods, the air scanner analysis method is an image analysis method by the penetration of ultrasound, and the EIS analysis method is based on the diffusion and interfacial resistance measurement principle. These test methods require a long time to test and are not suitable for the wetting degree evaluation method, and thus they are not widely used.

In addition, all the above-mentioned conventional analysis methods need sampling analysis to determine if poor wetting occurred during production, and cannot quantify or specify the wetting degree.

Accordingly, there is a need for a method for evaluating the wetting degree in a time-saving and quantitative way without disassembling a battery cell in a lithium ion battery.

DISCLOSURE

Technical Problem

The present disclosure is directed to providing a method for determining the wetting degree in a time-saving and quantitative way without disassembling a battery cell.

Technical Solution

To solve the above-described problem, the present disclosure proposes a method for determining the wetting degree using a low current test. The wetting degree determination method according to the present disclosure includes a) obtaining, as a reference charge profile, a charge profile recorded while charging a reference battery cell having undergone receiving an electrode assembly and an electrolyte solution in a case, assembling and pre-aging with a low current of 0.01 C-rate or less, b) measuring and recording a charge profile while charging another battery cell having undergone receiving an electrode assembly and an electrolyte solution in a case, assembling and pre-aging with a low current of 0.01 C-rate or less in the same way as the reference battery cell, and c) determining the wetting degree of another battery cell relative to the reference battery cell by comparative analysis of the reference charge profile and the measured charge profile.

Charging in the step of recording the charge profile in the a) and b) may include charging with a constant current until a cut-off voltage.

Preferably, the charge profile is a graph showing a change in battery cell voltage as a function of charging time.

In this instance, the comparative analysis in the c) may include determining based on the time required to reach the cut-off voltage or a slope difference of the charge profile. Preferably, the cut-off voltage is 2.0V or less.

Recording the measured charge profile while charging with the low current of 0.01 C-rate or less may form a part of a formation process which is an initial charging step for the battery cell.

In an embodiment, another battery cell is assembled and pre-aged in the same way as the reference battery cell, and the b) and the c) are performed to test all battery cells in a production line.

Preferably, the reference battery cell and another battery cell are assembled in a same line, and the charge profile is recorded by charging the reference battery cell and another battery cell simultaneously in a same charger/discharger.

In another embodiment, specifications for determining the wetting degree as a function of pre-aging condition are obtained by assembling another battery cell in the same way as the reference battery cell and pre-aging in a different condition.

For example, the pre-aging may be performed between 2 hours and 48 hours.

Advantageous Effects

According to the present disclosure, it is possible to quantitatively evaluate and specify the wetting degree of a battery cell in a lithium ion battery.

According to the present disclosure, it is possible to measure the wetting degree of all battery cells without disassembling the battery cells in the production line.

In addition, according to the present disclosure, the determination method does not have complex measurement conditions, and can be performed within the manufacturing process including the existing formation process. Accordingly, it is time-saving.

Using the determination method according to the present disclosure, it is possible to determine the wetting degree of a battery cell easily and quickly, and optimize the amount of electrolyte solution that needs to be injected by reflecting the determined wetting degree on the lithium ion battery production process, thereby reducing defects. It is possible to detect poor wetting in a battery cell and sufficiently wet to make a good battery cell. Accordingly, it is possible to prevent assembled battery cells from being improperly discarded, thereby improving productivity.

BRIEF DESCRIPTION OF THE DRAWINGS

The accompanying drawings illustrate the embodiments of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
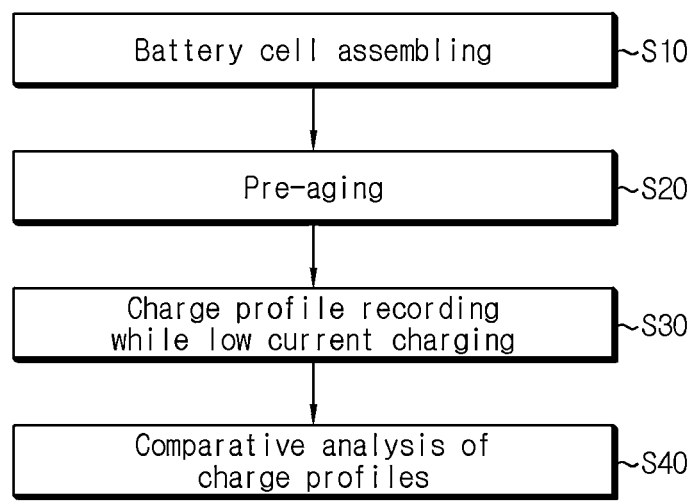
FIG. 1 is a flowchart of a wetting degree determination method according to an embodiment of the present disclosure.

Hereinafter, the embodiments of the present disclosure will be described with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description provided herein and illustration shown in the accompanying drawings is just an embodiment of the present disclosure, but not intended to fully describe the technical aspects of the present disclosure, so it should be understood that other equivalents and modifications could be made thereto at the time of filing the application.

In the following embodiment, a lithium ion battery refers collectively to batteries in which electrochemical reactions occur in the positive electrode and the negative electrode by the action of lithium ions as working ions during charging and discharging.

It should be interpreted as that even though the name changes depending on the type of an electrolyte solution or a separator used in a lithium ion battery cell, the type of a case (or a packaging) used to package the lithium ion battery cell and the internal or external structure of the lithium ion battery, the lithium ion battery covers any battery using a lithium ion as a working ion.

Additionally, the lithium ion battery is not limited to the number of components. Accordingly, the lithium ion battery should be interpreted as including a single battery cell including an electrode assembly of positive electrode/separator/negative electrode and an electrolyte solution in a case as well as an assembly of unit battery cells, a module including assemblies connected in series and/or in parallel, a pack including modules connected in series and/or in parallel, and a battery system including packs connected in series and/or in parallel.

The following description is provided with reference to the accompanying drawings of the present disclosure. The embodiments described in the detailed description, the accompanying drawings and the appended claims are not intended to be limiting. Other embodiments may be used without departing from the aspect and scope of the subject matter disclosed herein, and other modifications may be made thereto. The embodiments of the present disclosure as commonly described herein and illustrated in the accompanying drawings may have arrangement, substitution, combination, separation and design of a variety of other elements, and it will be immediately understood that these have been definitely considered herein.

Unless otherwise defined, all terms including technical and scientific terms used herein have the same meaning as commonly understood by those skilled in the art.

The present disclosure is not limited to specific embodiments described herein. It is obvious to those skilled in the art that many modifications and changes may be made thereto without departing from the technical aspect of the present disclosure. In addition to the description provided herein, functionally equivalent methods within the scope of the present disclosure will be obvious to those skilled in the art from the previous description. Such modifications and changes are put in the scope of the appended claims. The present disclosure will be defined by the appended claims along with the full scope of equivalents to which the appended claims are entitled. It should be understood that the present disclosure is not limited to specific methods to which modifications may be made. It should be further understood that the terminology as used herein is used to describe specific embodiments, but not intended to limit the present disclosure.

Hereinafter, a method for determining the wetting degree of a lithium ion battery cell according to an embodiment of the present disclosure will be described with reference to FIG. 1. In this embodiment, the wetting degree determination method according to the present disclosure is performed during a formation process in the aging lab after sealing of the lithium ion battery cell.

Referring to FIG. 1, a battery cell is assembled by receiving an electrode assembly and an electrolyte solution in a case and sealing the case (S10).

First, an electrode assembly including a positive electrode, a negative electrode and a separator interposed between the positive electrode and the negative electrode is manufactured. The step of manufacturing the electrode assembly includes applying an electrode slurry including an active material and a binder on an electrode current collector to manufacture each of a positive electrode and a negative electrode, and placing a separator between the positive electrode and the negative electrode. The step of manufacturing the electrode assembly is not limited to a particular method and may be performed by known methods. Additionally, the electrode assembly is not limited to a particular structure and may include any structure including the positive electrode, the negative electrode and the separator, for example, jelly-roll type, stack type or stack/folding type structures.

The negative electrode in the electrode assembly may include a carbon-based negative electrode active material. The carbon-based negative electrode active material may be artificial graphite or natural graphite.

The electrolyte solution may include an organic solvent and a lithium salt. The organic solvent is not limited to a particular type, and may include any type of organic solvent that minimizes decomposition by the oxidation reaction during charging/discharging of the battery and exhibits desired characteristics, for example, cyclic carbonate, linear carbonate, ester, ether or ketone. These may be used singly or in combination. Among the above-described organic solvents, the carbonate-based organic solvent may be especially desirable. The cyclic carbonate may include ethylene carbonate (EC), propylene carbonate (PC) and butylene carbonate (BC), and the linear carbonate typically includes dimethyl carbonate (DMC), diethyl carbonate (DEC), dipropyl carbonate (DPC), ethylmethyl carbonate (EMC), methylpropyl carbonate (MPC) and ethylpropyl carbonate (EPC). The lithium salt may include, without limitation, lithium salts commonly used in the electrolyte solution of lithium secondary batteries, for example, $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiA_1O_4$, $LiAlCl_4$, $LiSO_3CF_3$ and $LiClO_4$, used singly or in combination.

The case may be preferably a pouch of an aluminum laminate sheet.

Subsequently, pre-aging is performed on the assembled battery cell (S20).

The pre-aging refers to aging required for wetting by the electrolyte solution. The pre-aging may be performed between 2 hours and 48 hours. As the injected electrolyte solution flows into the battery cell over time, the battery cell is filled with the necessary electrolyte solution, and the electrode, for example, the active material layer is impregnated with the electrolyte solution. The pre-aging may be performed under the room temperature and normal pressure condition.

After assembling and pre-aging follows the injection of the electrolyte solution, a charge profile is recorded while charging the battery cell with low current (S30).

The previous steps S10 and S20 are performed on another battery cell by assembling and pre-aging in the same way as the previous battery cell, and S30 is performed to obtain a charge profile. The wetting degree is determined by comparative analysis of the charge profiles between the two battery cells (S40). A battery cell that is below the mass production level may be determined to be a wetting poor battery cell by quantitatively evaluating all produced battery cells based on the level of a difference of charge profile results.

Here, the battery cell that serves as reference for comparative analysis is referred to as a reference battery cell, and the charge profile of the reference battery cell is referred to as a reference charge profile. The charge profile of another battery cell compared with the reference battery cell is referred to as a measured charge profile. The wetting degree of another battery cell relative to the reference battery cell may be determined by comparative analysis of the reference charge profile and the measured charge profile. The charge profile may be obtained as a graph showing changes in battery cell voltage as a function of charging time.

If necessary, after the reference charge profile is obtained, S10, 20 and 30 may be only performed on produced battery cells, and S40 may be performed.

Additionally, in view of the current production process performed by simultaneous assembling and simultaneous formation, the reference battery cell and another battery cell are assembled in the same line, and the charge profile is recorded while charging the reference battery cell and another battery cell simultaneously in the same charging/discharging device, followed by comparative analysis. That is, in the previous example, after the sub-processes S10, 20, 30 are performed many times, S40 is performed, while in this example, S10, 20, 30, 40 are performed on all battery cells in that order. Those skilled in the art will understand that there are a variety of other changes to the order and combinations.

In this instance, the low current level in S30 is microcurrent of 0.01 C-rate or less. When "C" is the charge capacity Q of the battery cell in A·h, the current in ampere is selected as a divider (or a multiplier) of C. For example, 1 C-rate refers to a charge/discharge rate at which the capacity of the fully charged battery cell is discharged or charged in 1 hour, and may refer to the current density at that time.

In S30, constant current (CC) charging is performed with low current until the cut-off voltage is reached. The charge current may be 0.01 C-rate, but when the charge current is too low, it take a long time to reach the cut-off voltage, resulting in the increased production time of the entire production line, and thus an appropriate charge current is set between 0 and 0.01 C-rate.

The cut-off voltage of S30 is on the level of 2.0V or less. When the cut-off voltage is too low, it may be difficult to identify the charge profiles. When the cut-off voltage is too high, it takes a long time to reach the cut-off voltage, resulting in the increased production time of the entire production line. Accordingly, the cut-off voltage is appropriately set between 0 and 2.0V.

Figure 2:
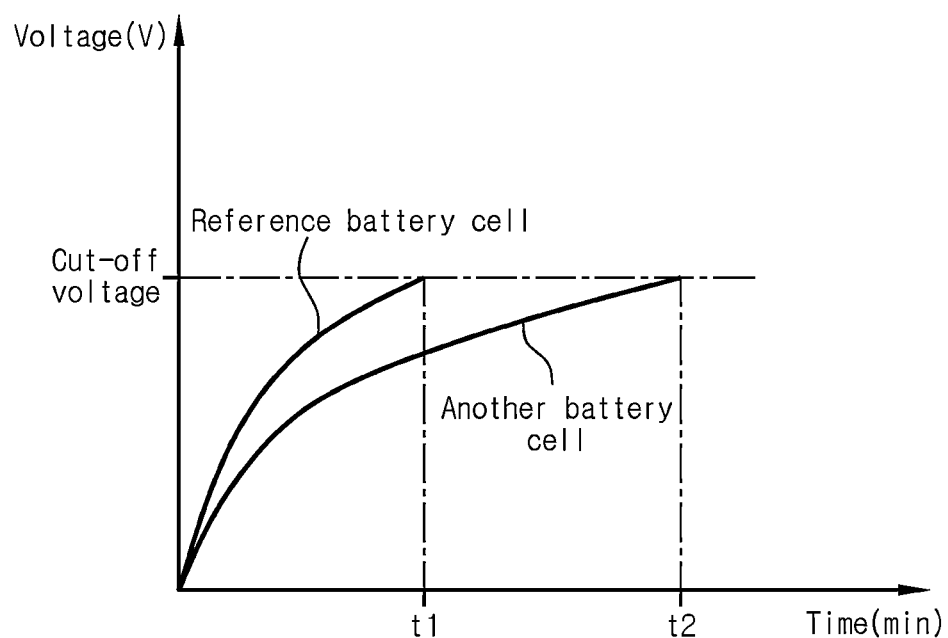
FIG. 2 is a graph showing a comparison of charge profile between different battery cells.

Primary charging is performed on the battery cell impregnated through pre-aging with a very low current of 0.01 C-rate or less as proposed by the present disclosure to the low voltage of 2.0V or less as proposed by the present disclosure, which makes a difference in capacity by the wetting degree of the battery cell, and thus the reference cell and another cell have a difference in the charge profile results as shown in FIG. 2. The wetting degree may be determined by the time t1, t2 required to reach the cut-off voltage or a slope difference of the charge profiles. Here, the slope may be an average voltage slope until the time t1, t2 required to reach the cut-off voltage, or a slope corresponding to the tangent line at a particular time.

For a predetermined number or more of battery cells, when the wetting degree is determined compared to the reference battery cell, the results may be collected to quantitatively evaluate and specify the wetting degree. It is possible to determine if the electrolyte solution is sufficiently impregnated or how much the electrolyte solution is impregnated, and predict the reason of the occurrence of a non-impregnated area and the reason of a difference in extent of the occurrence of a non-impregnated area. Improvements may be reflected on the production process based on the observation results and their reason.

For example, when the time required to reach the cut-off voltage is slower than the average of the time required for many battery cells to reach the cut-off voltage or the time required for the reference battery cell to reach the cut-off voltage by a preset value, for example, 5% or more or 10% or more, it may be determined as a wetting poor battery cell. In a similar example, when the slope of the charge profile is smaller than the average slope of many battery cells or the slope of the reference battery cell by a preset value, for example, 5% or more or 10% or more, it may be determined as a wetting poor battery cell. Here, the preset value serving as reference for determination may be appropriately changed.

The present disclosure is characterized in that the wetting degree is determined using low current charging, and the step (S30) of recording the measured charge profile while charging the low current of 0.01 C-rate or less forms a part of the formation process in the initial charging step of the battery cell. The conventional analysis methods are performed before or after the formation process. In contrast, the determination method of the present disclosure may form a part of the formation process.

In detail, the formation process may include constant current (CC) charging with the low current of 0.01 C-rate or less (i.e., in the present disclosure, charging with low current to determine the wetting degree) until the cut-off voltage is reached, and maintaining the current of about 0.1 C-rate constantly for about 3 hours for formation to form a Solid Electrolyte Interface (SEI) layer. The formation is generally performed at about 0.1 C-rate, so 0.01 C-rate is referred to as low current in the specification since it is lower.

Instead, the formation process may include constant current (CC) charging with the low current of 0.01 C-rate or less until it reaches the cut-off voltage, applying a higher C-rate constant current (CC) than the low current to generate nuclei of a SEI layer, and subsequently, maintaining a lower C-rate constant current (CC) to grow the nuclei. The C-rate at the initial stage of charging may be higher than that of the last stage. For example, at the initial stage of charging, charging is performed at 1 C-rate to 2 C-rate, and at a later stage of charging, charging is performed at 0.1 C-rate to 0.3 C-rate. In the initial stage of charging, charging at high C-rate may be very short, for example, for about 1 min, and preferably for about 30 sec. Subsequently, charging at low C-rate may be longer than charging at high C-rate, for example, for about 2 hours or more. The time taken to maintain the low C-rate current may be adjusted according to the target SOC % in this step. It is possible to partially charge between 10% and 50% of the battery capacity, or fully charge to 100% of the battery capacity.

At each C-rate, constant current (CC) charging is performed, but at the end of the formation process, charging may end with constant voltage (CV) charging. In this case, CV charge voltage may be 3.9V to 4.5V, but is not limited thereto. In the CC range, with the increasing charge cycles, the voltage of the battery cell increases, and when the voltage of the battery cell reaches the preset voltage value (for example, 4.2V), the CC range is changed to the CV range and charging continues in the CV range. In the CV range, charging is performed while maintaining the preset voltage value (4.2V). In the CV range, when the current value reaches the preset value (for example, in the case of 2000 mAh battery, 2000 multiplied by ½0 is 100 mA) by uniformly reducing the current while maintaining the voltage value (4.2V), it may be determined as full charge and charging may be stopped.

The formation process taken as the second example is an example of applying a large overcurrent (for example, 1 C-rate) at the early stage of the SEI layer formation process to instantaneously generate many nuclei, and applying low current (for example, 0.1 C-rate) again to grow a uniform SEI layer, and this is not intended to limit the present disclosure. In the formation process, to perform the determination method according to the present disclosure performed at the earlier stage, constant current charging with the low current of 0.01 C-rate or less may be a preparation step before applying high C-rate current. The constant current charging with the low current of 0.01 C-rate or less may be provided to stabilize the electrode or system before the SEI layer formation. That is, the wetting degree determination method may be performed as a part of a formation process without a separate measurement step.

The determination method of the present disclosure does not have complex measurement conditions, and can be performed within the manufacturing process including the existing formation process.

The remaining formation process is only performed on the battery cell determined to have good wetting in the determination step (S40). When primary charging is completed, the general manufacturing step including aging, discharging and degassing is performed in that order and a performance test is performed to produce good products.

One of differences between lithium ion batteries and earlier batteries is that an aging process is necessary to allow the electrolyte solution to permeate into the empty space of the electrode to form a stabilized electrolyte solution channel. Usually, the aging period may be about 1 day, but considering the diffusion coefficient of potential metal impurities, a longer aging period may be set. Additionally, when aging is performed at the high temperature of about 65° C., the aging period may be reduced to ensure coating stability and uniformity.

The discharge current and time under the discharge condition may be set according to the SOC of the lithium ion battery. It is possible to discharge between 10% and 50% of battery capacity, or fully discharge. Through the discharging step, it is possible to check the capacity of the battery, and prevent the current density non-uniformity caused by the non-uniform distribution of the battery active material. Preferably, after aging is completed, the voltage (OCV) and resistance (IR) of the battery is measured to detect a defect and discharging is performed to 40 to 50% of the total capacity of the fully charged battery to produce in halfcharged condition. In the case of discharging, constant current discharging may be performed.

Additionally, gas is produced when forming the SEI layer, and to remove the gas, degassing is performed. The degassing is performed in reduced state after opening the sealed pouch or case or cutting part of the pouch or case, and when the gas release is completed, the cut case is sealed again.

When the battery cell is determined to have poor wetting in the determination step (S40) due to delayed wetting, since it is not a structural defect of the battery cell but delayed performance, further wetting may be performed to complete the formation process. When poor wetting is not detected and formation is performed on the poor battery cell together with other battery cells, followed by performance testing, a defect that is highly likely to be determined to be a defect in the performance test is immediately discarded, and the effort and cost required to assemble the battery cell are in vain. The present disclosure does not simply detect and discard a wetting poor battery cell, and sufficiently wets to make a good battery cell, thereby preventing the assembled battery cell from being improperly discarded.

Other embodiments will be described in more detail through experimental examples. Almost of the description of the previous embodiment can be used in this embodiment, but in particular, the configuration of obtaining the specifications for wetting degree determination according to the pre-aging condition by assembling another battery cell in the same way as the reference battery cell and pre-aging in a different condition will be described.

The determination method of the present disclosure will be understood more immediately with reference to the following experimental examples, and the experimental examples are provided by way of illustration, but not intended to limit the present disclosure.

The determination method of the present disclosure is applied to 2,500 mAh @ 0.2C-rate cylindrical battery cell. It includes electrolyte solution injection, wetting for each pre-aging period, and 0.005 C-rate constant current (CC) charging, in which the cut-off voltage is 1.5V (when 0.005 C-rate is calculated with respect to 2,500 mAh, the charge current is 12.5 mA).

The pre-aging period is 2 hours to 48 hours for each battery cell.

Figure 3:
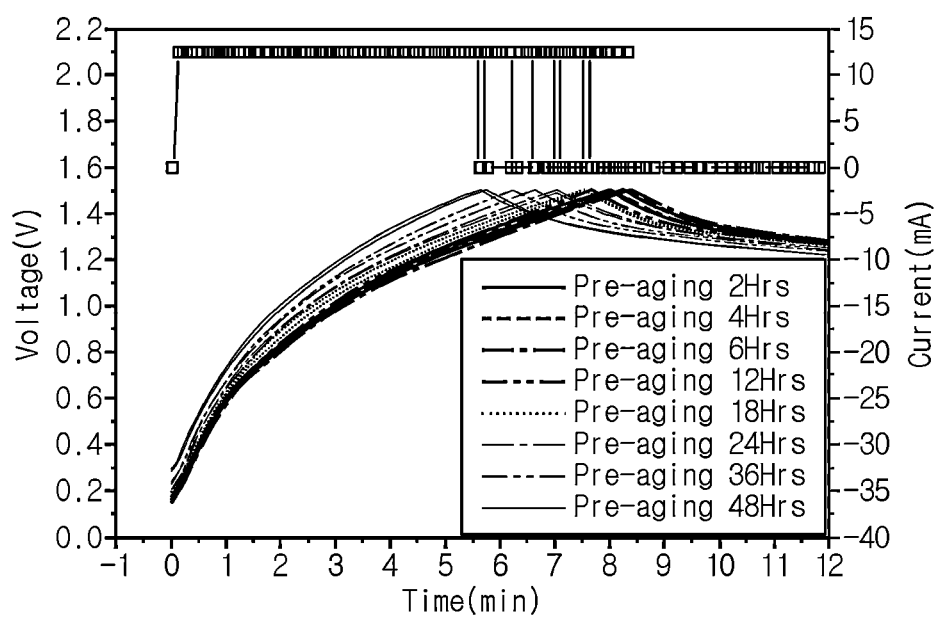
FIG. 3 is a graph showing changes in battery cell voltage as a function of charging time for each pre-aging condition according to another embodiment of the present disclosure.

FIG. 3 is a graph showing changes in battery cell voltage as a function of charging time, and Table 1 summarizes the time required to reach the cut-off voltage of 1.5V for each pre-aging period, i.e., each wetting time. In FIG. 3, the left Y axis indicates the voltage, and the right Y axis indicates the current. In FIG. 3, the upper graph is a current graph, and the lower graph is a voltage graph.

TABLE 1

| Pre-aging time | 2 h | 4 h | 6 h | 12 h | 18 h | 24 h | 36 h | 48 h |
|---|---|---|---|---|---|---|---|---|
| Time required to reach 1.5 V (min) | 8.1 | 8.3 | 8.3 | 7.8 | 7.5 | 7.0 | 6.4 | 5.7 |

Referring to FIG. 3 and Table 1, as pre-aging is longer (i.e., as the time for wetting is longer), when charging with the current of 0.005 C-rate, the time required to reach the cut-off voltage of 1.5 V is gradually shorter. In the case of 2 hour pre-aging, 8.1 min is required to reach 1.5 V, and in the case of 48 hour pre-aging, 5.7 min is required. The results conform to the prediction that as the time for wetting is longer, wetting will be better, and as wetting is better, the time required to reach the cut-off voltage will be shorter. In addition, before charging all produced battery cells in mass production, the experiment demonstrates that it is possible to obtain the specifications for detecting a wetting poor battery cell after low current charging at 0.001 C-rate or less (in this experimental example, 0.005 C-rate) for about 6-8 min.

Figure 4:
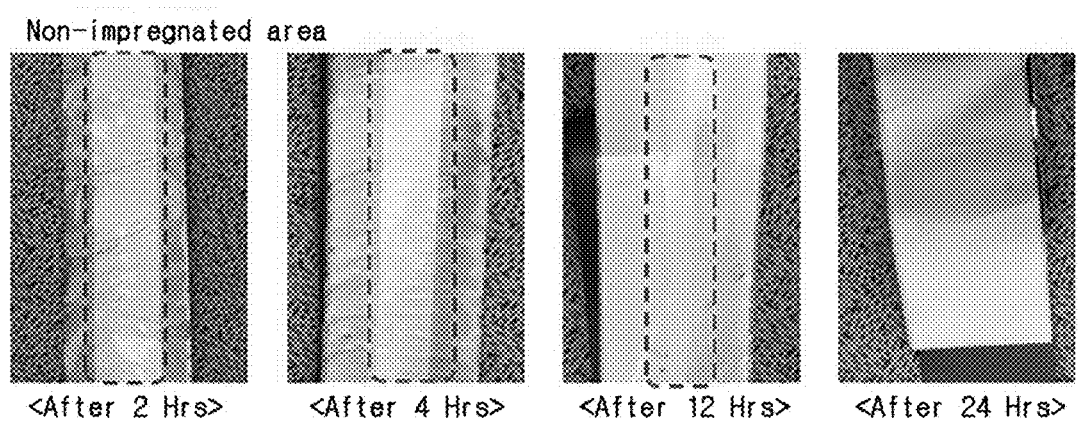
FIG. 4 is a photographic image of electrode wetting areas after 2, 4, 12, 24 hours for each pre-aging condition.

FIG. 4 is a photographic image of electrode wetting areas after 2, 4, 12, 24 hours for each pre-aging condition. As pre-aging is longer (i.e., the time for wetting is longer), the non-impregnated area of the separator by the electrolyte solution gradually reduces, and after 24 hours, the wetting area cannot be seen with the naked eye. However, as shown in FIG. 3, in the low current charge profile, there is a difference in the time required to reach the cut-off voltage after 24, 36, 48 hours, and the present disclosure can find a wetting difference that is too small to identify with the naked eyes from the comparison of charge profiles. Through these results, it is possible to technically determine if wetting is necessary by pre-aging each battery cell model for 24 hours or longer.

In FIG. 3, the X axis of the graph is the time axis showing the duration for which the constant current is applied, and eventually, denotes the charge capacity Q, and the Y axis of the graph denotes the voltage V. Differentiation results dV/dQ, and this is the slope of the graph.

Figure 5:
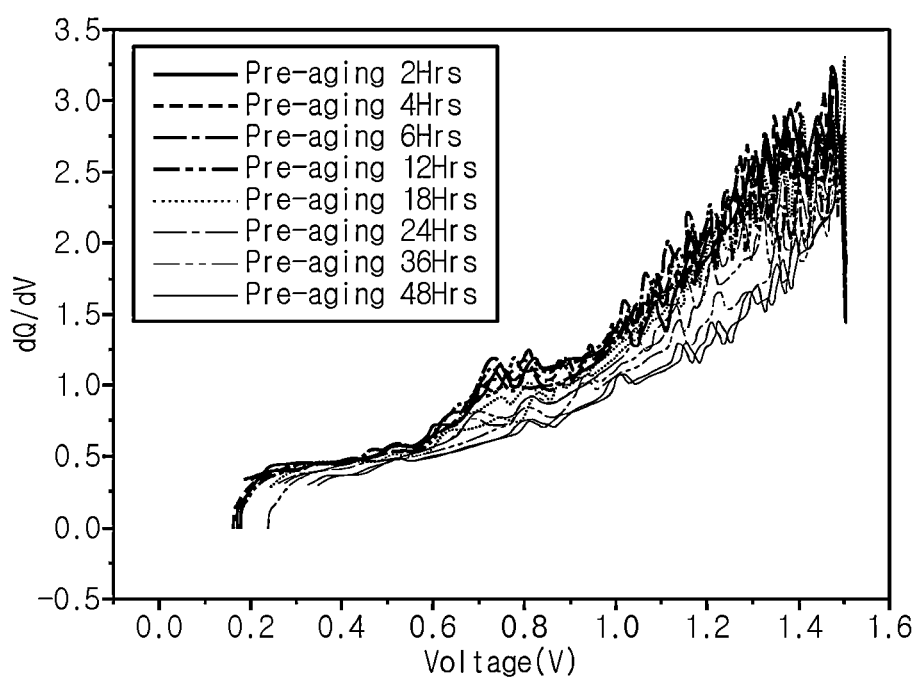
FIG. 5 shows dQ/dV (the inverse of the slope (dV/dQ) of the graph of FIG. 3) vs battery cell voltage.

FIG. 5 shows dQ/dV (the inverse of the slope (dV/dQ) of the graph of FIG. 3) vs battery cell voltage. FIG. 5 shows a difference more clearly than FIG. 3 so that it is easy to see.

Referring to FIG. 5, as pre-aging is longer (i.e., as the time for wetting is longer), the graph changes in shape. Accordingly, it is possible to obtain specifications by real-time differentiation of the initial low current charge value in mass production.

In general, as the resistance is lower, the battery cell reaches the voltage later in the same CC charging, and it may be interpreted that in the wetting by the electrolyte solution, the battery cell has a capacitor structure, and electric charges are accumulated on the positive/negative electrode surface rather than the substance movement between positive/negative electrodes by oxidation and reduction reactions of lithium ions to the range of very low C-rate current and very low voltage at the initial stage, and thus the capacitance component is the main zone, and in this experimental example, the longer the wetting, the higher the rate at which electric charges are accumulated on the positive/negative electrode surface, resulting in quick voltage rise.

On the contrary, when the current is larger than 0.01 C-rate, or the cut-off voltage is higher than 2.0V, there is no difference in the time required to reach irrespective of the wetting degree.

In actual production, the method is as follows. The wetting degree determination for each wetting time is not applied to the actual production. It is because the wetting time is the same on the basis of product dimensions. Accordingly, when a certain battery cell has poor wetting, it is possible to detect the poor battery cell according to an embodiment mentioned previously. For example, when the battery cell lamination after stacking the separator on the electrode is overperformed due to corona or uses a vacuum wetting process to improve the wetting after injection, causing a procedural problem, and the battery cell may have poor wetting. When the battery cell does not have a structural defect and simply its performance is delayed in time, there is no need to discard the battery cell, and accordingly there is no productivity reduction problem.

Meanwhile, the method according to the present disclosure can be used to determine the injection amount of the electrolyte solution. For example, when many battery cells are assembled with varying injection amounts of the electrolyte solution, pre-aging is performed in the same condition and the evaluation method according to the present disclosure is applied, it is possible to obtain the specifications of the wetting degree determination as a function of the injection amount of the electrolyte solution.

When the external current or voltage is applied, electrons move from the negative electrode to the positive electrode due to a potential difference, and in this instance, the electrolyte solution acts as a medium, which makes it easy for electrons to move. Accordingly, in the design of the lithium ion battery, for proper wetting of the electrolyte solution, it is necessary to calculate the total amount of the electrolyte solution and inject the electrolyte solution in the calculated amount, and for sufficient wetting, a considerable amount of time is required, resulting in low productivity. In this situation, when the wetting degree of the electrolyte solution is determined beforehand to determine the amount of electrolyte solution required, productivity will increase.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A wetting degree determination method, comprising:
a) obtaining, as a reference charge profile, a charge profile recorded while charging a reference battery cell having undergone receiving an electrode assembly and an electrolyte solution in a case, assembling and pre-aging with a low current of 0.01 C-rate or less;
b) measuring and recording a charge profile while charging a second battery cell having undergone receiving an electrode assembly and an electrolyte solution in a case, assembling and pre-aging with a low current of 0.01 C-rate or less in a same way as the reference battery cell; and
c) determining the wetting degree of the second battery cell relative to the reference battery cell by comparative analysis of the reference charge profile and the measured charge profile.

2. The wetting degree determination method according to claim 1, wherein charging in the step of recording the charge profile in a) and b) comprises charging with a constant current until a cut-off voltage.

3. The wetting degree determination method according to claim 1, wherein the charge profile is a graph showing a change in battery cell voltage as a function of charging time.

4. The wetting degree determination method according to claim 3, wherein the comparative analysis in c) comprises determining based on the time required to reach a cut-off voltage or a slope difference of the charge profile.

5. The wetting degree determination method according to claim 2, wherein the cut-off voltage is 2.0V or less.

6. The wetting degree determination method according to claim 1, wherein recording the measured charge profile while charging with the low current of 0.01 C-rate or less forms a part of a formation process which is an initial charging step for the battery cell.

7. The wetting degree determination method according to claim 1, wherein the second battery cell is assembled and pre-aged in the same way as the reference battery cell, and b) and c) are performed to test all battery cells in a production line.

8. The wetting degree determination method according to claim 1, wherein the reference battery cell and the second battery cell are assembled in a same line, and the charge profile is recorded by charging the reference battery cell and the second battery cell simultaneously in a same charger/discharger.

9. The wetting degree determination method according to claim 1, wherein specifications for determining the wetting degree as a function of pre-aging condition are obtained by assembling the second battery cell in the same way as the reference battery cell and pre-aging in a different condition.

10. The wetting degree determination method according to claim 9, wherein the pre-aging is performed between 2 hours and 48 hours.

11. A wetting degree determination method, comprising:
pre-aging a reference battery with a current of 0.01 C-rate or less for 2 to 48 hours;
injecting the reference battery with an electrolyte solution;
obtaining a reference charge profile by charging the reference battery with a constant current between 0 and 0.01 C-rate;
pre-aging a second battery with a current of 0.01 C-rate or less for 2 to 48 hours;
injecting the second battery with an electrolyte solution;
obtaining a charge profile by charging the second battery with a constant current between 0 and 0.01 C-rate; and
determining a wetting degree of the second battery relative to the reference battery by comparative analysis of the reference charge profile and the charge profile.

12. The wetting degree determination method according to claim 11, wherein the obtaining the reference charge profile and the obtaining the charge profile are performed until a cut-off voltage.

13. The wetting degree determination method according to claim 12, wherein the cut-off voltage is 2.0V or less.

14. The wetting degree determination method according to claim 12, wherein the charge profile includes a graph showing a change in a battery cell voltage as a function of charging time.

15. The wetting degree determination method according to claim 14, wherein the comparative analysis comprises determining based on the time required to reach the cut-off voltage or a slope difference of the charge profile.

16. The wetting degree determination method according to claim 11, wherein the second battery is determined as a poor battery when the time to reach the cut-off voltage is 5% more than an average time.

17. The wetting degree determination method according to claim 11, wherein the second battery is determined as a poor battery when the slope difference of the charge profile is 5% more than an average slope.

18. The wetting degree determination method according to claim 11, wherein the reference battery and the second battery are assembled in a same line, and the charge profile is recorded by charging the reference battery and the second battery simultaneously in a same charger/discharger.

19. The wetting degree determination method according to claim 18, wherein the pre-aging is performed under room temperature and atmospheric pressure condition.

20. The wetting degree determination method according to claim 11, wherein specifications for determining the wetting degree as a function of pre-aging condition are obtained by assembling the second battery in the same way as the reference battery and pre-aging in a different condition.

* * * * *